United States Patent
Little et al.

(10) Patent No.: US 7,783,896 B2
(45) Date of Patent: Aug. 24, 2010

(54) SYSTEM AND METHOD FOR MANAGEMENT OF PLAINTEXT DATA IN A MOBILE DATA PROCESSING DEVICE

(75) Inventors: Herbert A. Little, Waterloo (CA); Anthony Scian, Waterloo (CA)

(73) Assignee: Research In Motion Limited, Waterloo (CA)

( * ) Notice: Subject to any disclaimer, the term of this patent is extended or adjusted under 35 U.S.C. 154(b) by 1387 days.

(21) Appl. No.: 11/221,196

(22) Filed: Sep. 6, 2005

(65) Prior Publication Data
US 2007/0055890 A1   Mar. 8, 2007

(51) Int. Cl.
G06F 11/30 (2006.01)
G06F 12/14 (2006.01)

(52) U.S. Cl. .......................................... 713/189; 726/2
(58) Field of Classification Search ................... 713/189
See application file for complete search history.

(56) References Cited

U.S. PATENT DOCUMENTS

| | | | |
|---|---|---|---|
| 5,699,428 A | | 12/1997 | McDonnal et al. |
| 5,892,899 A * | | 4/1999 | Aucsmith et al. ............ 726/27 |
| 6,085,323 A * | | 7/2000 | Shimizu et al. ............. 713/150 |
| 6,507,911 B1 * | | 1/2003 | Langford ................... 713/193 |
| 6,553,466 B1 * | | 4/2003 | Friedman et al. ............ 711/152 |
| 6,735,693 B1 * | | 5/2004 | Hamlin ...................... 713/168 |
| 6,973,570 B1 * | | 12/2005 | Hamlin ...................... 713/168 |
| 7,136,488 B2 * | | 11/2006 | Hashimoto et al. .......... 380/277 |
| 7,370,165 B2 * | | 5/2008 | Meharchand et al. ....... 711/163 |
| 7,406,174 B2 * | | 7/2008 | Palmer ........................ 380/28 |
| 7,529,929 B2 * | | 5/2009 | Asokan et al. .............. 713/161 |
| 2003/0093397 A1 * | | 5/2003 | Yuasa ............................ 707/1 |
| 2003/0200450 A1 * | | 10/2003 | England et al. ............. 713/189 |
| 2003/0227645 A1 * | | 12/2003 | Hisatomi et al. ........... 358/1.13 |
| 2006/0129848 A1 * | | 6/2006 | Paksoy et al. ............... 713/193 |
| 2006/0190729 A1 * | | 8/2006 | Uchida ....................... 713/168 |
| 2007/0192397 A1 * | | 8/2007 | Lauter et al. ................ 708/523 |
| 2009/0327751 A1 * | | 12/2009 | Koifman et al. ............. 713/189 |

* cited by examiner

*Primary Examiner*—Farid Homayounmehr
(74) *Attorney, Agent, or Firm*—Jenna L. Wilson; Dimock Stratton LLP

(57) ABSTRACT

A handheld data processing device includes stored data that is intended to be kept secure from unauthorized access. The handheld data processing device includes applications that store such secure data and which make use of plain text data corresponding to the secure data. An identifier is defined to be associated with defined plain text data. When the handheld data processing device is placed in a locked or secure state, code executable on the device is able to search for plain text identifiers. Code executable on the device is consequently able to display to the user whether plain text data is stored on the device or not.

16 Claims, 4 Drawing Sheets

SYSTEM AND METHOD FOR MANAGEMENT OF PLAINTEXT DATA IN A MOBILE DATA PROCESSING DEVICE

FIELD OF INVENTION

This invention relates to mobile data processing systems aid devices. In particular, this invention relates to a system and method for managing plain text data in memory of a mobile data processing device.

BACKGROUND OF THE INVENTION

The use of mobile data processing devices has increased significantly in recent years. In addition to so called "laptop" and "tablet" computers, there is a growing popularity in hand-held mobile data processing devices, sometimes called "personal digital assistants" or "PDAs" as well as smart phones. These mobile data processing devices are capable of storing a significant amount of user data, including calendar, address book, tasks and numerous other types of data for business and personal use. Most handheld data processing devices have the ability to connect to a personal computer for data exchange, and many are equipped for wireless communications using, for example, conventional email messaging systems. Depending upon the user's needs much of this data can be highly sensitive in nature, for example, where the device is used in government, the military or a commercial enterprise.

Because of their mobile nature, such devices may be lost or stolen with the consequential risk that data on the devices will be accessed by unauthorized individuals. For this reason, mobile data processing systems are typically password protected. However, such protection may be insufficiently secure if the data stored on the device is not encrypted. Accordingly, data stored in persistent memory on a handheld device is typically encrypted using an: encryption key. For the data to be accessed by an application executing on the device, a decrypted copy of the encrypted data, or plain text data, is made available for use by the application. The plain text data may be used in processing carried out by the application, may be displayed on the device for viewing by the user, or may be sent to other users through email or other delivery means. Since the plain text data is by definition not encrypted, an unauthorized user of the device may be able to view, copy or transmit an unencrypted copy of the data if such a user gains access to the device. Thus, it is advantageous to be able to place the system in a secure state where no plain text data is available in the memory of the device, leaving only secure, encrypted data stored on the device.

However, in a typical handheld data processing device, applications executing on the device are able to copy, modify or move plain text data in the device memory. Although application execution may be designed so as to clear plain text data from memory at certain defined points in the application operation, applications may have programming errors such that they fail to actually clear all plain text data from memory. Consequently, when it is time to secure the device, relying on application operation will not ensure that all the plain text data stored in device memory has been cleared.

It is therefore desirable for a mobile data processing device, supporting storage of encrypted data, to be provided with a memory management mechanism to facilitate confirmation that the device has been successfully placed in a secure state.

BRIEF DESCRIPTION OF THE DRAWINGS

In drawings which illustrate by way of example only a preferred embodiment of the system.

DETAILED DESCRIPTION OF THE INVENTION

According to an aspect of the invention, when an application executing on a mobile data processing device decrypts secure data into plain text, an identifier is created that is associated with that plain text data and its location in memory. If an application creates copies of the plain text data, or generates new plain text data, additional identifiers are created to track the plain text data in memory.

According to another aspect of the invention, when the mobile data processing device is "locked", or transferred to a secure state, a process executes which accesses memory in the device to identify any plain text data in memory. A display is provided to the user to indicate whether or not there is plain text data remaining in the device memory. Since there are identifiers associated with each piece of sensitive plain text data, the process operating to access the memory of the device effectively evaluates the success of the device entering a secure state. This provides feedback to the user intended to prevent the user from considering the system to be secure when, in reality, there are still plain text objects remaining in the device memory.

According to one aspect of the invention, there is provided a method of monitoring the use of decrypted plain text data and ensuring that all plain text data has been cleared from memory when the device enters a secure state.

An aspect of the present invention further provides a system for evaluating the performance of applications and ensuring that all plain text data created by an application can be cleared from the system.

The present invention further provides a method of securing a device to ensure no decrypted data remains in memory alter the device has entered the secure state.

Figure 1:
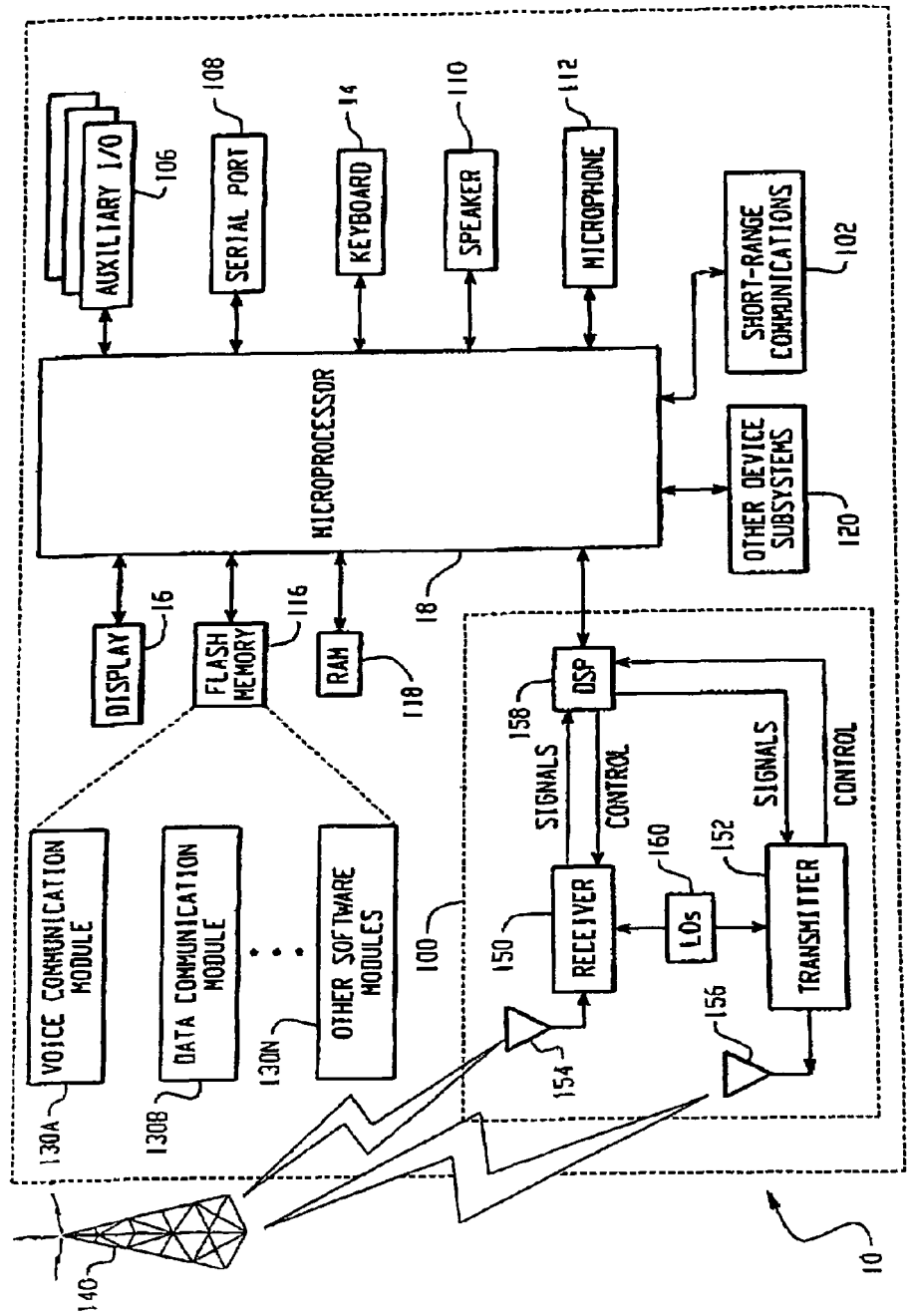
FIG. 1 is a block diagram of a system overview of a conventional mobile data processing device.

A preferred embodiment of the system of the invention will be described in detail below, by way of example only, in the context of a hand-held mobile data processing device having wireless communications capabilities as illustrated in FIG. 1. However, it will be appreciated that the principles apply to other data processing devices and the system is not intended to be limited thereby.

The hand-held data processing devices 10 include a housing, a keyboard 14 and an output device 16. The output device shown is a display 16, which is preferably a full graphic LCD. Other types of output devices may alternatively be utilized. A processor 18, which is shown schematically in FIG. 1, is contained within the housing and is coupled between the keyboard 14 and the display 16. The processor 18 controls the operation of the display 16, as well as the overall operation of the mobile device 10, in response to actuation of keys on the keyboard 14 by the user.

The housing may be elongated vertically, or may take on other sizes and shapes (including clamshell housing structures). The keyboard may include a mode selection keys or other hardware or software for switching between text entry and telephony entry.

In addition to the processor 18, other parts of the mobile device 10 are shown schematically in FIG. 1. These include communications subsystems 100; short-range communications subsystem 102; keyboard 14 and display 16, along with other input/output devices 106, 108, 110 and 112; as well as memory devices 116, 118 and various other device subsystems 120. Mobile device 10 is preferably a two-way RF communication device having voice and data communication capabilities. In addition, mobile device 10 preferably has the capability to communicate with other computer systems via the Internet.

Operating system software executed by the processor 18 is preferably stored in a persistent store, such as a flash memory 116, but may be stored in other types of memory devices, such as a read only memory (ROM) or similar storage element. In addition, system software, specific device applications, or parts thereof, may be temporarily loaded into a volatile store, such as memory 118 which may be random access memory (RAM). Communication signals received by the mobile device may also be stored to memory 118.

The processor 18, in addition to its operating system functions, enables execution of software applications 130A-130N on the device 10. A predetermined set of applications that control basic device operations, such as data and voice communications 130A and 130B, may be installed on the device 10 during manufacture. In addition, a personal information manager (PIM) application may be installed during manufacture. The PIM is preferably capable of organizing and managing data items, such as e-mail, calendar events, voice mails, appointments, and task items. The PIM application is also preferably capable of sending and receiving data items via a wireless network 140. Preferably, the PIM data items are seamlessly integrated, synchronized and updated via the wireless network 140 with the device user's corresponding data items stored or associated with a host computer system.

Communication functions, including data and voice communications, are performed through the communications subsystem 100, and possibly through the short-range communications subsystem. The communication subsystem 100 includes a receiver 150, a transmitter 152, and one or more antennas 154 and 156. In addition, the communication subsystem 100 also includes a processing module, such as a digital signal processor (DSP) 158, and local oscillators (LOs) 160. The specific design and implementation of the communication subsystem 100 is dependent upon the communication network in which the mobile device 10 is intended to operate. For example, a mobile device 10 may include a communication subsystem 100 designed to operate with the Mobitex™, Data TAC™ or General Packet Radio Service (GPRS) mobile data communication networks and also designed to operate with any of a variety of voice communication networks, such as AMPS, TDMA, CDMA, PCS, GSM, etc. Other types of data and voice networks, both separate and integrated, may also be utilized with the mobile device 10.

Network access requirements vary depending upon the type of communication system. For example, in the Mobitex and DataTAC networks, mobile devices are registered on the network using a unique personal identification number or PIN associated with each device. In GPRS networks, however, network access is associated with a subscriber or user of a device. A GPRS device therefore requires a subscriber identity module, commonly referred to as a SIM card, in order to operate on a GPRS network.

When required network registration or activation procedures have been completed, the mobile device 10 may send and receive communication signals over the communication network 140. Signals received from the communication network 140 by the antenna 154 are routed to the receiver 150, which provides for signal amplification, frequency down conversion, filtering, channel selection, etc., and may also provide analog to digital conversion. Analog-to-digital conversion of the received signal allows the DSP 158 to perform more complex communication functions, such as demodulation and decoding. In a similar manner, signals to be transmitted to the network 140 are processed (e.g. modulated and encoded) by the DSP 158 and are then provided to the transmitter 152 for digital to analog conversion, frequency up conversion, filtering, amplification and transmission to the communication network 140 (or networks) via the antenna 156.

In addition to processing communication signals, the DSP 158 provides for control of the receiver 150 and the transmitter 152. For example, gains applied to communication signals in the receiver 150 and transmitter 152 may be adaptively controlled through automatic gain control algorithms implemented in the DSP 158.

In a data communication mode, a received signal, such as a text message or web page, download, is processed by the communication subsystem 100 and is input to the processor 18. The received signal is then further processed by the processor 18 for an output to the display 16, or alternatively to some other auxiliary I/O device 106. A device user may also compose data items, such as e-mail messages, using the keyboard 14 and/or some other auxiliary I/O device 106, such as a touchpad, a rocker switch, a thumb-wheel, or some other type of input device. The composed data items may then be transmitted over the communication network 140 via the communication subsystem 100.

In a voice communication mode, overall operation of the device is substantially similar to the data communication mode, except that received signals are output to a speaker 110, and signals for transmission are generated by a micro phone 112. Alternative voice or audio I/O subsystems, such as a voice message recording subsystem, may also be implemented on the device 10. In addition, the display 16 may also be utilized in voice communication mode, for example to display the identity of a calling party, the duration of a voice call, or other voice call related information.

The short-range communications subsystem enables communication between the mobile device 10 and other proximate systems or devices, which need not necessarily be similar devices. For example, the short-range communications subsystem may include an infrared device and associated circuits and components, or a Bluetooth™ communication module to provide for communication with similarly-enabled systems and devices.

As will be appreciated by those skilled in the art, a device such as that represented by device 10 in FIG. 1 may be a wireless handheld device on which confidential information is stored and processed. In such a typical case, confidential information will be maintained as data for which access will be provided to authorized users, only. In the hand-held mobile data processing device of the preferred embodiment, different types of confidential information are stored on the device as encrypted data in memory 116.

Figure 2:
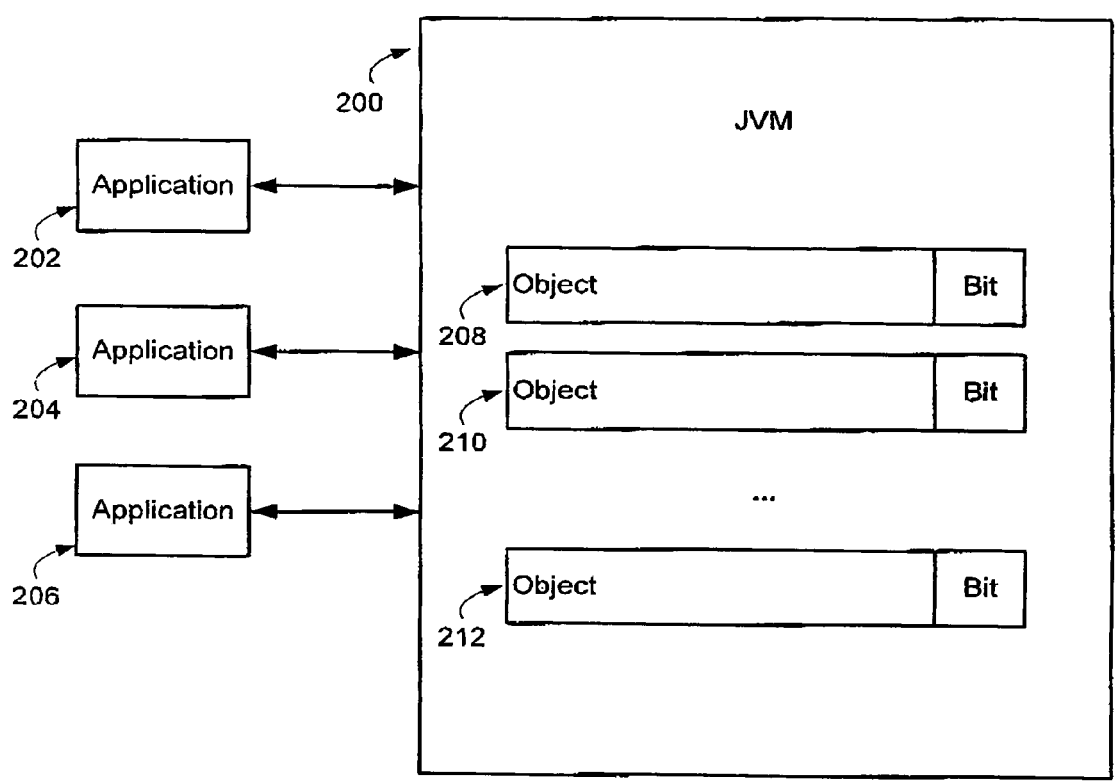
FIG. 2 is a block diagram showing an example relationship between the Java virtual machine, applications and plain text data according to the preferred embodiment.

As is set out schematically in FIG. 2, in the preferred embodiment, one of the software modules 130A ... 130N is Java Virtual Machine 200 (JVM 200). JVM 200 is a virtual machine that operates to interpret Java code comprising applications and to carry out related functions such as memory management, all in a manner understood for virtual machine function, and known to those skilled in the art. In the preferred embodiment, all applications executable on the mobile device comprise code that is interpreted by JVM 200 and therefore device 10 may rely on the operation of JVM 200 to manage device memory 118. As will be appreciated, other mobile processing devices may be implemented in which memory management is carried out in other ways. Although the description of the preferred embodiment relates to the use of JVM 200, it will be appreciated that the memory management techniques set out will apply to other, non-Java implementations or to implementations where a virtual machine and other computing device code together carry out memory management.

FIG. 2 shows a block diagram illustrating the relationship between an example JVM 200 and applications that are interpreted by JVM 200 (shown as applications 202, 204, 206 in the example in the figure). Applications define objects which are managed by JVM 200, shown by example in FIG. 2 as objects 208, 210, 212. In typical operation, applications 202, 204, 206 will define and use objects 208, 210, 212, as appropriate. JVM 200 will carry out memory management tasks relating to those objects to ensure that JVM 200 makes efficient use of the memory resources available on device 10. This is particularly important for this mobile device environment where there may be significant constraints on the memory resources available in the device.

In the preferred embodiment, JVM 200 supports encryption of Java objects. If one of applications 202, 204, 206 requests an object that includes data stored in encrypted memory, JVM 200 is responsible for copying the encrypted data into its plain text form and for then making the plain text data available to the application (passing the data to the application). In typical operation, after decryption of the data in the requested object, the plain text copy of the data is stored in memory 118 on device 10 so as to be available to the requesting application. In the preferred embodiment, applications 202, 204, 206, for example, are operative to request data objects from JVM 200 and to release data objects using JVM 200.

In a mobile data processing device, such as that on which the preferred embodiment is implemented, it is desirable for the memory management functionality of the device to be carried out to assure a given level of security for information stored as data on the device. For example, it is desirable to be able to place the device in a secure state. In a mobile data processing device, the user will typically use applications executing on the device to process data that is confidential. During the time that the user is making use of such data (using an email application to read and send email messages, making appointments in a calendar application, and so on) the device uses a plain text copy of otherwise encrypted data.

However, when the user has completed making use of the device, it is advantageous to put the device in a secure state in which data on the device is in an encrypted form, only (and hence unavailable to unauthorized users). When a device enters such a secure state, the plain text copies of encrypted data representing private information for the user that were used by applications on the device, such as a task list or calendar, are cleared from memory. In the preferred embodiment, a memory cleaner application is operative to send messages to running applications on the device to invoke steps in the application operation to remove copies of plain text objects used by the applications. In such an arrangement each application is relied upon to correctly act on receiving such a message. If an application does not carry out these steps to clean up plain text objects correctly, the device may enter what is intended to be a secure state with plain text data in memory.

Further, if such steps are not correctly taken, the plain text copies of data may be available to persons other than the authorized user of the device. Being able to switch between states where the plain text data is available (for efficient device operation), and a state where it is not, is particularly important with a mobile data processing device where the use is intermittent and unpredictable, and where the potential for loss or theft of the device is relatively high.

In the preferred embodiment, as a part of the memory handling carried out by JVM 200, an identifier is created and associated with the plain text data to indicate that the data is either derived from encrypted data or the data is intended to be dealt with in a secure fashion on the device. Plain text data is typically obtained after a decryption step. However, data which is intended to be encrypted at a figure stage in application operation, or data which is temporarily used by an application but is intended to be kept secure, may also be considered to be plain text data.

Different implementations of this aspect of the memory handling in JVM 200 are possible. In FIG. 2 one implementation is shown in which a predetermined bit within a byte array is defined to act as a flag. This is shown by the bits defined in objects 208, 210, 212, respectively. When the appropriate bit is set, it identifies the associated byte array as representing plain text data.

In another implementation of the preferred embodiment, the identifier is a short byte, or word, within a byte array. The byte or word may take different values to indicate not only that the associated data object is plain text data but also to indicate which one of a set of possible levels of security is associated with the data. For instance, a word identifier may specify one of a set of public, private and secure data types for the associated object. In this implementation of the preferred embodiment, JVM 200 is able to invoke different memory management steps, depending on the data type specified by the value of the word identifier.

The JVM 200 of the preferred embodiment includes computing device code operative, by execution on the mobile device, to define a plain text identifier, as described above, and to carry out memory management operations based on the value of a particular plain text identifier. It should be noted that in this description of the preferred embodiment, there are several memory management steps and procedures that are described relating to the marking of plain text by the use of a plain text identifier. However, it will be appreciated that there may also be implementations where the marking of plain text itself may be of use to applications themselves in their use of such data on the mobile data processing device. In such a case, the memory management component of JVM 200 relating to the plain text identifiers created may be relatively restricted or minimal in its operation.

In the preferred embodiment, it is desirable to permit different types of plain text memory objects to be retained as plain text for different time periods. For example, the private information of the user such as the plain text data representing the information in a task list, may be kept by the device in a plain text form until the user specifies that the device should be placed in a secure (or locked) state. In another example, the device 10 of the preferred embodiment supports pass codes. The system and method of the preferred embodiment permits memory management of JVM 200 to clear the plain text copy of an encrypted pass code from memory as soon as the application that requested the decryption of the pass code has released it. This may happen before there is a request that the system enter a secure state.

As referred to above, although applications 202, 204, 206 are intended to function such that plain text objects are not made available after release by the applications, through poor design or errors in the applications or by deliberate choice, such plain text copies may be left in memory by an application. The approach of the preferred embodiment permits JVM 200 to manage the memory objects 208, 210, 212 such that on entering a secure state the user of the device will be notified as to whether there is plain text data in memory.

In the preferred embodiment a ribbon application is defined to manage a portion of the content shown on display 16. On display 16 a defined region contains a ribbon of information that relates to system usage and availability. The ribbon application is code executable on device 10 operable to obtain device status information and to manage the display of such information on display 16. In the preferred embodiment, when there is a request to place device 10 in a secure state, the ribbon, application makes use of JVM 200 to determine if there are plain text objects in memory. JVM 200 has code executable to receive a request for the plain text object status from the ribbon application. JVM 200 carries out the steps described below to determine if a plain text object is in memory. If such a plain text object is found, the appropriate message is returned to the ribbon application. The ribbon application operates to display an icon in the ribbon region of display 16 reflecting whether device 10 is in a secure state in which there are no plain text objects available in memory (a closed padlock icon) or not (an open padlock icon).

In this manner, the use of plain text bits permits the device user to be assured that the device in a secure state has no data that may be placed at risk or, alternatively, that application error has resulted in the device containing plain text data in memory despite the attempt to make the device secure.

Figure 3:
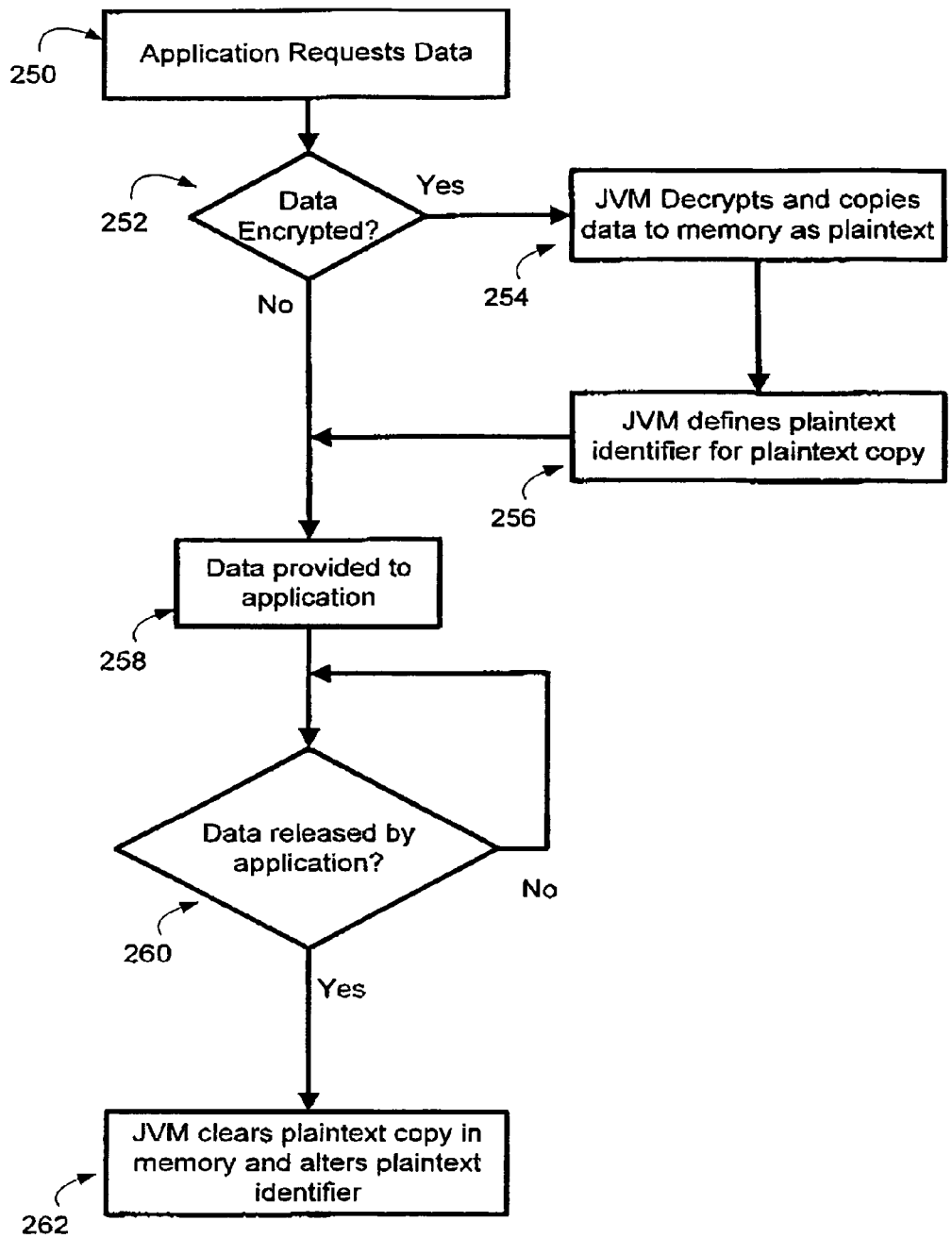
FIG. 3 is a flowchart showing steps in marking plain text data and clearing plain text data in accordance with an implementation of the preferred embodiment.

FIG. 3 shows a simple flowchart setting out the steps of the method carried out by the code of JVM 200 operative to ensure that plain text copies of encrypted data are cleared when an application releases objects including encrypted data. At block 250, an application request for access to a data object is made. In the preferred embodiment, applications are described as requesting access to data objects. Such access includes the step of the application defining a data object for subsequent use.

At decision block 252, JVM 200 determines whether the data requested is encrypted. If the data is determined to be encrypted, at block 254 JVM 200 carries out the decryption (either directly or by launching a decryption process). Block 256 represents the step of NM 200 defining a plain text identifier for association with the plain text copy of the encrypted data. The plain text identifier may be a bit or set of bits (byte or word) associated with the byte array defining the plain text data or, as described below, it may be a table entry associated with the plain text copy of the data. JVM 200 saves a plain text copy of the encrypted data to device memory (block 254) for use by the requesting application. As is indicated in block 258 of FIG. 3, JVM 200 provides the plain text to the requesting application (in the preferred embodiment by specifying the availability of plain text data in the device memory).

Decision block 260 shows JVM 200 executing to carry out the step of determining whether the requesting application has released the object having plain text data associated with it. Although FIG. 3 shows a looping decision step, implementations of the system and method of the preferred embodiment will likely implement other methods for applications to specify the release of data objects to JVM 200. Such methods are known to those skilled in the art and are not described further here. The result of the release of the object by the application is that, as shown in block 262, the code of JVM 200 is operative to clear the plain text data from device memory 118 and is operative to alter the plain text identifier to reflect the removal of the plain text data from device memory 118.

As will be appreciated, where an implementation of the preferred embodiment defines the plain text identifier as a specified bit or set of bits associated with a byte array in memory, the step of clearing the plain text data from memory may include the step of similarly clearing the plain text bit or bits from memory. Alternatively, if the plain text identifier is defined in a table, as described below, JVM 200 may, as part of the step shown in block 262 of FIG. 3, modify the value of the plain text identifier (to show that the plain text data previously in the device memory has been cleared) or may remove the table entry entirely.

As indicated above, a plain text identifier mechanism that may be implemented as an alternative to a bit associated with a bitstream in memory is a table that records all secure objects that have been decrypted. In the system of the preferred embodiment, such a table will be defined and maintained by JVM 200. As will be appreciated by those skilled in the art, although this description describes a table with table entries, other similar data structures may be used to allow the relevant plain text information to be stored and accessed, as described.

With respect to the table of plain text identifiers, each entry in the table records the existence in the device memory of plain text data that is a copy of encrypted data in the device, as well as the location in memory of the plain text data. Optionally, the table entry includes information about the level of security for that object. An advantage of using a table to record plain text identifiers is that for such an arrangement, JVM 200 does not carry out a scan through the device 10 memory 118 to locate plain text identifiers such as the bits in objects 208, 210, 212 when determining whether to alter a plain text identifier or determining whether there are plain text data objects in device memory 118. Instead, JVM 200 manages the table and as applications release objects, JVM 200 clears the plain text data from memory and updates the table accordingly.

Figure 4:
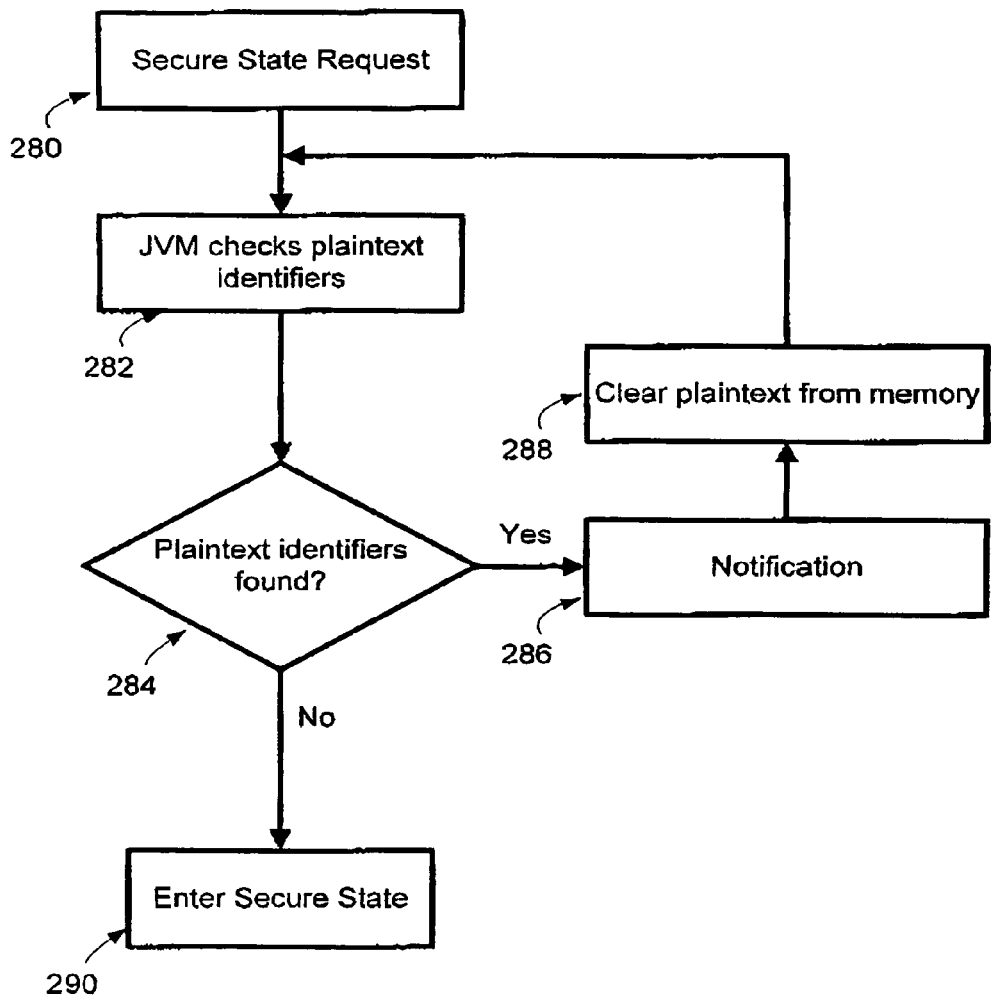
FIG. 4 is a flowchart showing steps for placing a device in a secure state in accordance with an implementation of the preferred embodiment.

For a high-security implementation, FIG. 4 presents a simple flowchart for JVM 200 code operative to carry out the steps of placing device 10 in a secure state. In the example of FIG. 4, device 10 is seeking to enter the secure state (block 280 shows receipt by JVM of a secure state request). As shown in block 282, JVM 200 reviews the identifier table (rather than device memory 118 itself) to determine whether there are any plain text identifier entries that correspond to plain text data in device memory 118. If there are such identifiers present in the table (decision block 284) then JVM 200 will, in one embodiment of the preferred embodiment, notify the user (block 286). This reporting mechanism may also indicate whether objects were improperly used by an application so as to create a potential security breach. This permits users to evaluate third party applications to ensure that they are maintaining information in a secure state. Without this reporting mechanism, users may not know how applications are treating their confidential data.

Following, or in conjunction with, the notification step of block 286, JVM 200 arranges to clear from memory the plain text data referenced by the located plain text identifier in the table (block 288). This process of checking for plain text identifiers, notifying the user and clearing the plain text data is repeated until there are no further plain text identifiers in the table. As will be appreciated, in one implementation it is possible for plain text identifier entries to remain in the table even after the related plain text data has been cleared. In such a case the entry will include a field to specify whether the entry is current or non-current. Non-current entries are potentially useful in assessing application or system performance or for troubleshooting application behaviour.

After all plain text entries in the plain text identifier table have been processed, JVM 200 is able to display information to assure the user that all confidential plain text data has been released by the applications and cleared from memory. As described above, JVM 200 permits the device to display an icon or other message to report to the user that all plain text copies of secure confidential information have been cleared from memory. The user can be assured that only encrypted confidential data, is left on the device.

In the case where the JVM 200 determines that plain text data has not been properly cleared from memory by application operation, various corrective measures are employed depending upon the security level of the data and of the device. Since applications use JVM 200 to store copies of secure objects in device memory 118, JVM 200 acts as a gate keeper. In the preferred embodiment, JVM 200 will, if plain text data mishandling is identified for an application, refuse to transfer a requested plain text object to the application's database (potentially copied into device memory 118). JVM 200 may report the presence of objects that have not yet been released by the application as is described above. If the application fails to clear the plain text data for an object, JVM 200 is configurable to either clear the object itself or to report the presence of the plain text object to the user, or both.

Depending upon the security level chosen for the device, a user can require JVM 200 to overwrite any remaining sensitive plain text objects with null characters, or force a "reset" of the device to clear all sensitive plain text information from memory before the device can enter the secure state. The advantage of this option is for high-security applications where an administrator would rather risk the device being unstable, through clearing memory without releasing objects, than permit sensitive data to remain on the device in plain text form.

The use of a plain text identifier table is also advantageous as JVM 200 may permit the definition of objects with defined security levels, as referred to above. Thus an entry in the plain text identifier table will be able to specify the security level for the decrypted object data that is stored in plain text form in the device memory. In this way, different reporting procedures and memory management steps may be carried out by JVM 200, depending on the defined security level for device 10 and on the specified security level in the table entry for the data object. A simple example relating to different timing of memory management steps for pass codes has been given above.

Further, plain text bits or a plain text identifier may be used to prevent plain text data from being written to flash memory 116 in device 10. Because data which is tagged as plain text by the plain text identifier is intended to remain secure (either through encryption or deletion) JVM 200 may be defined to operate to preclude any application from writing plain text data to persistent memory where the data may become available to unauthorized users. In one implementation, JVM 200 will lock if an application seeks to write plain text data to persistent memory such as flash memory 116. Where each data object has a plain text bit associated with it, JVM 260 operates to inspect the plain text bit when an application seeks to store the plain text object in flash memory 116. The status of the plain text bit will determine whether JVM 200 writes the object to flash memory 116 or alternatively throws an exception or locks the device. In the preferred embodiment, the response for JVM 200 may be determined by policies set by the device administrator.

A further use of the plain text identifier is in a debugging mode on device 10, used by application developers. The preferred embodiment provides that the debugger application operates to provide information to application developers as to the number and potentially identity of plain text objects in memory at different stages in application execution.

Various embodiments of the system and method of the invention having been thus described by way of example, it will be apparent to those skilled in the art that variations and modifications may be made without departing from the invention. For example, code adapted to provide the systems and methods described above may be provided on many different types of computer-readable media including computer storage mechanisms (e.g., CD-ROM, diskette, RAM, flash memory, computer's hard drive, etc.) that contain instructions for use in execution by a processor to perform the methods' operations and implement the systems described herein.

We claim:

1. A computing device program product comprising a non-transitory machine-readable medium storing code executable on a mobile data processing device comprising a device memory, the code being executable to cause the mobile data processing device to carry out the following:
   defining specified data to be stored in the device memory as plaintext data for use by an application executing on the mobile data processing device;
   storing the plaintext data thus defined in the device memory in association with an identifier indicating that the plaintext data is intended to be treated in a secure fashion, the identifier comprising an indicator of a security level associated with the plaintext data;
   determining, upon receipt of a request for the mobile data processing device to enter a secure state, whether the plaintext data is stored in the device memory; and
   displaying a notification indicating the presence of plaintext data in the device memory after receipt of said request to enter the secure state;
   clearing the plaintext data from the device memory after receipt of said request to enter the secure state; and
   preventing the application from storing the plaintext data in a persistent memory of the mobile data processing device.

2. The program product of claim 1, wherein storing the plaintext data in association with the identifier comprises storing the plaintext data and the associated identifier in a data object in the device memory.

3. The program product of claim 1, wherein the identifier comprises at least one bit in a byte array associated with the plaintext data.

4. The program product of claim 1, wherein the security level is selected from a set of security levels, the set comprising at least one of public, private and secure.

5. The program product of claim 1, wherein clearing the plaintext data comprises one of: deleting the data structure comprising the identifier when the plaintext data is cleared; or resetting the mobile data processing device.

6. The program product of claim 1, wherein the code is further executable to cause the mobile data processing device to carry out the following:
   clearing plaintext data associated with a predetermined security level in response to a request from an application to release the plaintext content prior to receiving the request for the mobile data processing device to enter the secure state.

7. The program product of claim 1, wherein the code is further executable to cause the mobile data processing device to carry out the following:
   preventing the application from storing the plaintext data in a persistent memory of the mobile data processing device by preventing further operation of the mobile data processing device upon an attempt by the application to store the plaintext data in the persistent memory of the mobile data processing device.

8. A method implemented on a mobile data processing device, the mobile data processing device comprising a device memory, the method comprising:
   defining specified data to be stored in the device memory as plaintext data for use by an application executing on the mobile data processing device;
   storing the plaintext data thus defined in the device memory in association with an identifier indicating that the plaintext data is intended to be treated in a secure fashion, the identifier comprising an indicator of a security level associated with the plaintext data;
   determining, upon receipt of a request for the mobile data processing device to enter a secure state, whether the plaintext data is stored in the device memory; and
   displaying a notification indicating the presence of plaintext data in the device memory after receipt of said request to enter the secure state;
   clearing the plaintext data from the device memory after receipt of said request to enter the secure state; and
   preventing the application from storing the plaintext data in a persistent memory of the mobile data processing device.

9. The method of claim 8, wherein storing the plaintext data in association with the identifier comprises storing the plaintext data and the associated identifier in a data object in the device memory.

10. The method of claim 8, wherein determining whether the plaintext data is stored in the device memory comprises searching for any identifiers indicating that plaintext data associated with said identifier is intended to be treated in a secure fashion.

11. The method of claim 8, wherein the identifier comprises at least one bit in a byte array associated with the plaintext data.

12. The method of claim 8, further comprising clearing plaintext data associated with a predetermined security level in response to a request from an application to release the plaintext content prior to receiving the request for the mobile data processing device to enter the secure state.

13. The method of claim 8, wherein clearing the plaintext data comprises one of: deleting the data structure comprising the identifier when the plaintext data is cleared; or resetting the mobile data processing device.

14. The method of claim 8, further comprising preventing the application from storing the plaintext data in a persistent memory of the mobile data processing device comprises preventing further operation of the mobile data processing device upon an attempt by the application to store the plaintext data in the persistent memory of the mobile data processing device.

15. The method of claim 8, wherein the plaintext data is intended to be treated in a secure fashion when it is: derived from encrypted data; or to be encrypted at a future stage during execution of the application.

16. The method of claim 8, further comprising, upon receipt of a request from an application to write plaintext data stored in the device memory to a persistent memory, writing the requested plaintext data to the persistent memory upon determining that the requested plaintext data is not associated with an identifier indicating that the plaintext data is intended to be treated in a secure fashion.

* * * * *